(12) United States Patent
U et al.

(10) Patent No.: US 10,776,097 B2
(45) Date of Patent: Sep. 15, 2020

(54) HIERARCHICAL SPANNING TREE SOFTWARE PATCHING WITH FRAGMENTATION SUPPORT

(71) Applicant: International Business Machines Corporation, Armonk, NY (US)

(72) Inventors: Kam Hou U, Brooklyn, NY (US); Angel A. Merchan, Poughkeepsie, NY (US); Thomas D. Fitzsimmons, Elverson, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 16/048,702

(22) Filed: Jul. 30, 2018

(65) Prior Publication Data

US 2020/0034132 A1 Jan. 30, 2020

(51) Int. Cl.
*G06F 8/65* (2018.01)
*H04L 29/06* (2006.01)
*H04L 29/08* (2006.01)

(52) U.S. Cl.
CPC ............. *G06F 8/65* (2013.01); *H04L 67/10* (2013.01); *H04L 67/42* (2013.01); *H04L 67/34* (2013.01)

(58) Field of Classification Search
CPC ... G06F 8/65; G06F 9/54; G06F 9/541; G06F 11/0709; G06F 11/079; G06F 11/0793; G06F 11/1425; G06F 11/1482; G06F 11/2033; G06F 11/2094; G06F 11/3409; G06F 11/3419; G06F 11/3442; G06F 11/3447; G06F 11/3466; H04L 67/42; H04L 67/10; H04L 67/12; H04L 34/34

USPC ............... 717/169; 714/4, 5, 11, 12, 13, 43
See application file for complete search history.

(56) References Cited

U.S. PATENT DOCUMENTS

| 7,287,180 | B1 | 10/2007 | Chen et al. |
| 9,626,177 | B1 * | 4/2017 | Madduri et al. .......... G06F 8/65 |
| 2005/0028001 | A1 | 2/2005 | Huang et al. |

(Continued)

OTHER PUBLICATIONS

Mell et al.; "The NIST Definition of Cloud Computing—Recommendations of the National Institute of Standards and Technology"; US Department of Commerce—Computer Security Division; Sep. 2011; 7 pages.

*Primary Examiner* — Wei Y Zhen
*Assistant Examiner* — Mohammed N Huda
(74) *Attorney, Agent, or Firm* — Cantor Colburn LLP; Teddi Maranzano

(57) ABSTRACT

A method includes grouping nodes into a first level clusters. For each first level cluster, a leader node is promoted. For each first level cluster that has a size exceeding a predetermined threshold, nodes of the cluster are grouped into second level clusters. For each second level cluster, a leader node is promoted. If no single node is trusted to patch its cluster, a fragmentation scheme is applied to enable nodes to check validity of the receiving patch. This grouping scheme is applied in a hierarchical manner until the size of all clusters are found to be under the predetermined threshold. A software patch is transmitted to the leader nodes of the first level clusters, which then transmit the software patch to next level leaders (if any) or to all other nodes within the same cluster. The patch transmission is done in a hierarchical manner for subsequent levels.

20 Claims, 10 Drawing Sheets

(56) References Cited

U.S. PATENT DOCUMENTS

2012/0197626 A1\* 8/2012 Kejariwal et al. .. G06F 11/3419
717/124
2017/0052830 A1\* 2/2017 Gambardella et al. ... G06F 8/65

\* cited by examiner

HIERARCHICAL SPANNING TREE SOFTWARE PATCHING WITH FRAGMENTATION SUPPORT

BACKGROUND

The present invention generally relates to server-client networks, and more specifically, to systems and methods for hierarchical spanning tree software patching with fragmentation support.

Software patching is often needed to maintain remote devices up-to-date, which assists in preventing vulnerability of attacks in a network such as a sever-client network. Hackers attempt to take advantage of outdated devices by attacking vulnerabilities of those devices. For example, a hacker may attempt to inject, attack, and/or spread malware across a network by tampering with the software of a particular device found in the server-client network. Example devices include network switches, user computers, and Internet-of-Things (IoT) enabled devices such as home automation devices, smart city, sensors and other devices.

Software patching in large networks can easily become unmanageable and open to attacks. Currently, some systems patch devices (e.g., client nodes) of a network by transmitting a patch from a single server to a large number of nodes. However, as only one server is tasked to update all nodes, those systems are unable to scale to support an increase in the number of devices in the network. This problem is magnified in networks that include IoT devices. Moreover, as some nodes are not directly accessible by the server, some nodes of the server-client network might be unreachable to the server when distributing patches (e.g., private subnetwork, local area network, LAN, etc.)

SUMMARY

Embodiments of the present invention provide a computer-implemented method for patching software in a server-client network. A non-limiting example of the computer-implemented method includes executing, by a server of the server-client network, a minimum spanning tree (MST) algorithm to group a plurality of client nodes of the server-client network down into a plurality of first level clusters. For each first level cluster of the plurality of first level clusters, promoting, by the server, a first client node within first level cluster to be a leader node of the first level cluster. For each first level cluster of the plurality of first level clusters that has a cluster size that exceeds a predetermined threshold size, executing, by the server, the MST algorithm to group non-leader client nodes of the first level cluster down into a plurality of second level clusters. For each second level cluster of the plurality of second level clusters, promoting, by the server, a first client node within the second level cluster to be a leader node of the second level. The method includes transmitting, by the server, a software patch to the leader nodes of the plurality of first level clusters, in which for each first level cluster of the plurality of first level clusters that has a cluster size that exceeds the predetermined threshold size, the leader node of the first level cluster is configured to transmit the software patch to the leader nodes of the second level clusters.

Embodiments of the present invention provide a system for patching software in a server-client network. The system includes at least a server and a plurality of client nodes, in which the server includes one or more processors that are configured to perform a method. A non-limiting example of the method includes executing, by the server, a minimum spanning tree (MST) algorithm to group the plurality of client nodes down into a plurality of first level clusters. For each first level cluster of the plurality of first level clusters, promoting, by the server, a first client node within first level cluster to be a leader node of the first level cluster. For each first level cluster of the plurality of first level clusters that has a cluster size that exceeds a predetermined threshold size, executing, by the server, the MST algorithm to group non-leader client nodes of the first level cluster down into a plurality of second level clusters. For each second level cluster of the plurality of second level clusters, promoting, by the server, a first client node within the second level cluster to be a leader node of the second level. The method includes transmitting, by the server, a software patch to the leader nodes of the plurality of first level clusters, in which for each first level cluster of the plurality of first level clusters that has a cluster size that exceeds the predetermined threshold size, the leader node of the first level cluster is configured to transmit the software patch to the leader nodes of the second level clusters.

Embodiments of the invention provide a computer program product for patching software in a server-client network, the computer program product comprising a computer readable storage medium having program instructions embodied therewith. The program instructions are executable by a server of the server-client network having one or more processors to cause the server to perform a method. A non-limiting example of the method includes executing, by the server, a minimum spanning tree (MST) algorithm to group the plurality of client nodes down into a plurality of first level clusters. For each first level cluster of the plurality of first level clusters, promoting, by the server, a first client node within first level cluster to be a leader node of the first level cluster. For each first level cluster of the plurality of first level clusters that has a cluster size that exceeds a predetermined threshold size, executing, by the server, the MST algorithm to group non-leader client nodes of the first level cluster down into a plurality of second level clusters. For each second level cluster of the plurality of second level clusters, promoting, by the server, a first client node within the second level cluster to be a leader node of the second level. The method includes transmitting, by the server, a software patch to the leader nodes of the plurality of first level clusters, in which for each first level cluster of the plurality of first level clusters that has a cluster size that exceeds the predetermined threshold size, the leader node of the first level cluster is configured to transmit the software patch to the leader nodes of the second level clusters.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
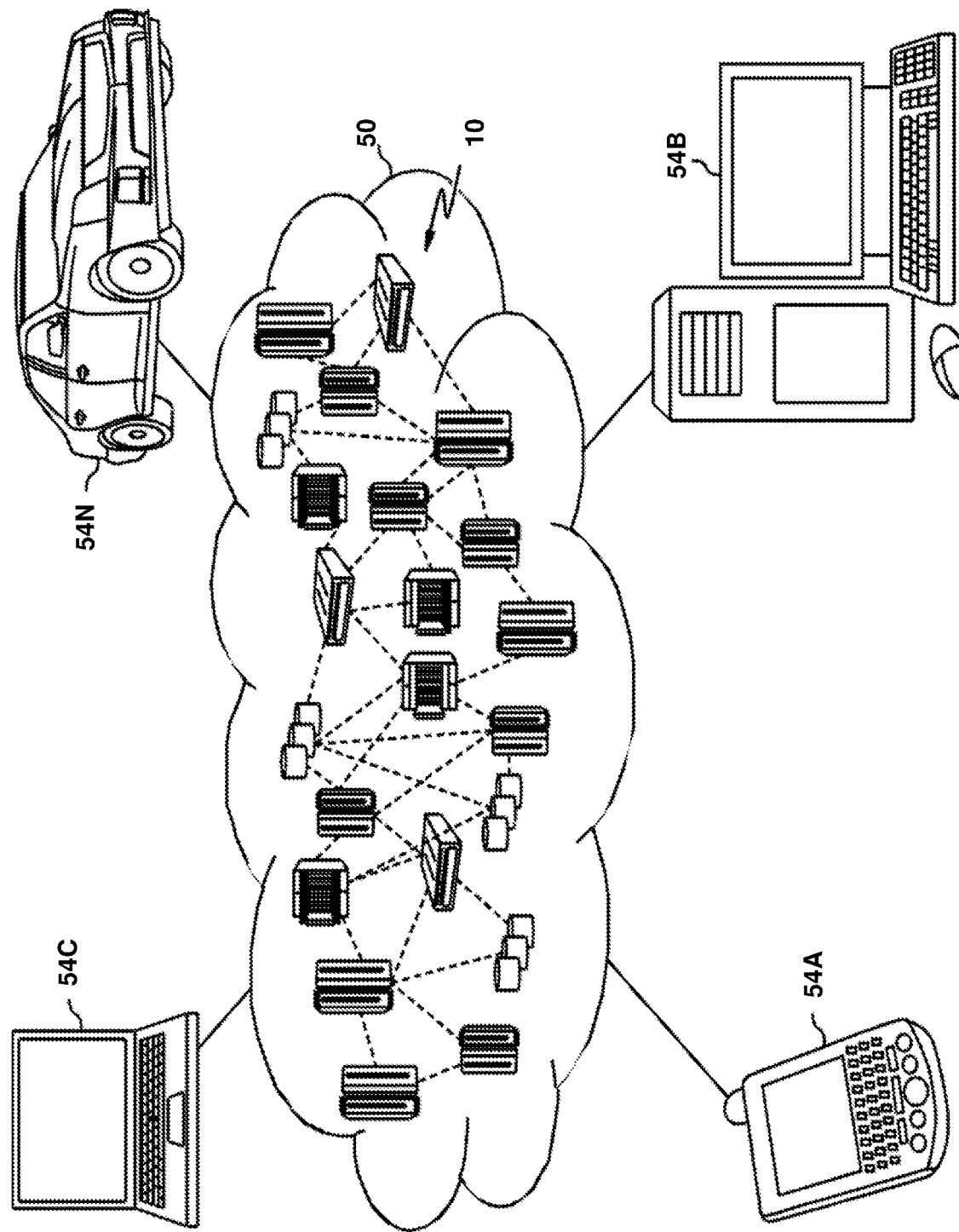
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
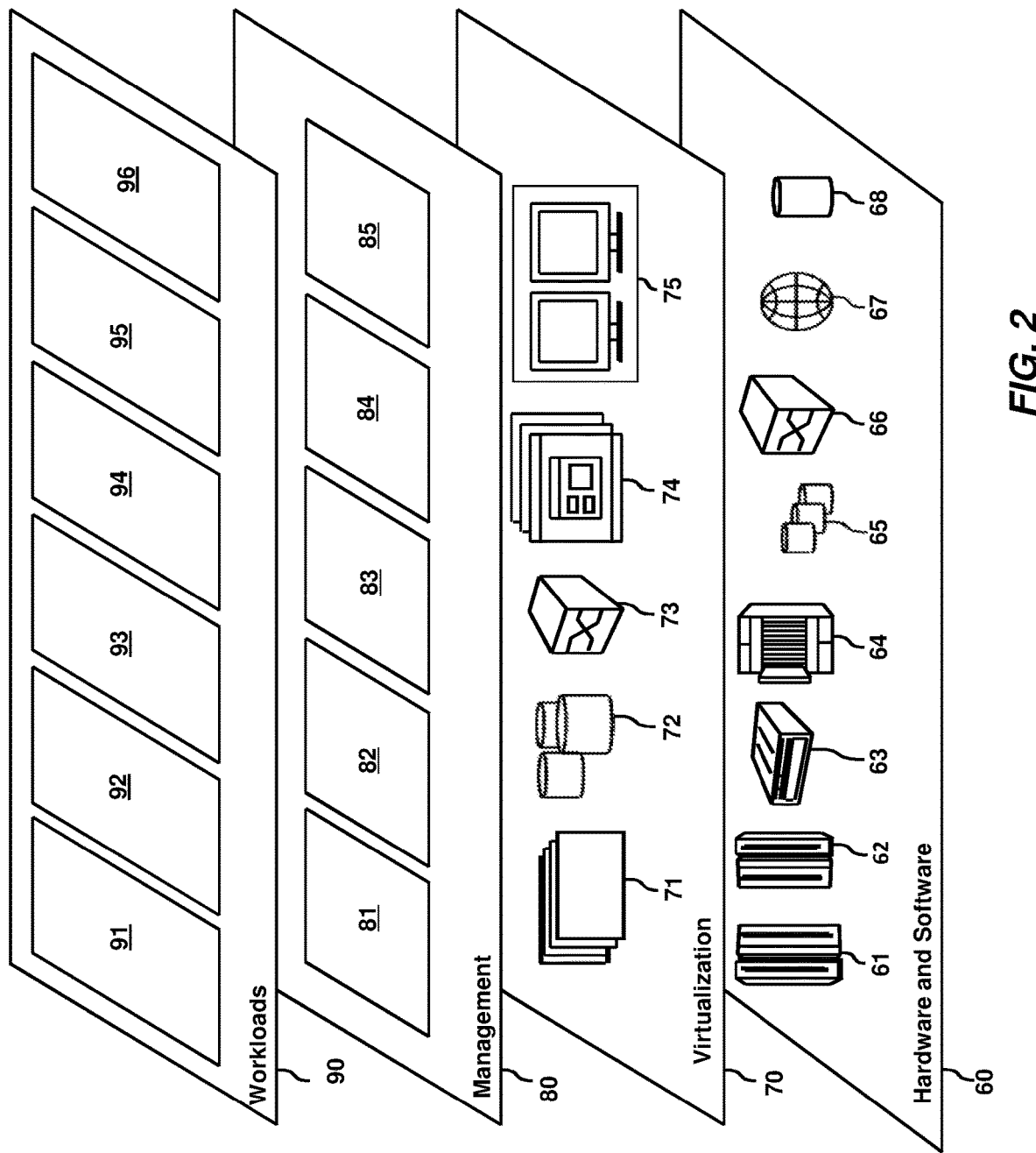
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software patching processing 96.

Turning now to an overview of technologies that are more specifically relevant to aspects of the invention, as noted above, software patching is often needed to maintain remote devices up-to-date, which assists in preventing vulnerability of attacks in a sever-client network. Hackers attempt to take advantage of outdated devices by attacking vulnerabilities of those devices. For example, a hacker may attempt to inject, attack, and/or spread malware across a network by tampering with software of a particular device found in the server-client network. Example devices include network switches, user computers, Internet-of-Things (IoT) enabled devices such as home automation devices, smart city, sensors and other devices.

Software patching in large networks can easily become unmanageable and open to attacks. Currently, some systems patch devices of a network (e.g., client nodes of a server-client network) by transmitting a patch from a single server to a large number of nodes. However, as only one server is tasked to update all nodes, those systems are unable to scale to support an increasing amount of devices on networks. This problem is magnified in networks that include IoT devices. Moreover, as some nodes are not directly accessible by the server, some nodes of the server-client network might be unreachable to the server when distributing patches (e.g., private subnetwork, local area network, LAN, etc.)

Some systems utilize spanning tree topology for clustering of nodes on a network. However, those systems utilize a fixed software repository to distribute patch in each cluster, which means that a single point of attack and/or failure of a cluster (e.g., a single node of the cluster) can result in failure for the entire cluster. Moreover, as a single repository is used to patch the entire network (e.g., single server to patch a plurality of nodes), network resources of the server are heavily burdened. For example, the server may have insufficient network bandwidth, processing speed, memory capacity, or other system resources to patch the entire network within a predetermined amount of time. Those systems do not scale well as cluster sizes increase.

Some systems utilizing hierarchical clustering for parallel processing of tasks, in which configuration of clusters ay dynamically configured for normal work flow. However, those systems do not take into consideration relations amongst nodes nor patching of nodes in view of those relations.

Turning now to an overview of the aspects of the invention, one or more embodiments of the invention address the above-described shortcomings of the prior art by providing a spanning tree topology process for patching software in a server-client network. In some embodiments of the present invention, the server-client network includes at least one server and a plurality of client nodes (e.g., computing devices of the server-client network). The server breaks down the network into a number of clusters, in which each cluster includes a number of client nodes. A "leader" node is then dynamically chosen in each cluster by the server. The server is configured to patch only the leader node(s) of each cluster and not to patch other nodes of the clusters. The responsibilities of the leader of each cluster is to patch the other nodes of their respective cluster. In some embodiments of the present invention, in the case where a cluster size of a cluster is exceeds a parameterized threshold (e.g., a predetermined maximum number of nodes), the cluster is further divided into second level clusters. This division recurs until all cluster sizes are under the parameterized threshold. In addition, in some embodiments of the present invention, in the case where no one node is completely trusted to patch the entire cluster (e.g., there is a likelihood above a predetermined threshold that that a node might be hacked), more than one leader can be promoted in the cluster and a patch will be fragmented amongst the multiple leader nodes of the associated cluster. The non-leader nodes would then communicate to all leaders in their associated cluster to obtain a complete patch. This allows the nodes of the clusters to perform a self-check against the leaders when receiving a patch update, and also reduces the amount of data the leaders have to transfer to the remaining nodes.

The above-described aspects of the invention address the shortcomings of the prior art by providing a system that is capable of patching nodes in a server-client network in a manner that is highly scalable for large networks. Computing resources utilized by the server are reduced as the server is not tasked to patch every node of the network directly, but rather one or more leader nodes of each cluster are assigned to patch respective nodes of their associated cluster. In cases where two or more leaders are assigned to a cluster, the amount of data leaders have to transfer to other nodes is reduced while still allowing for each node self-check against the leaders in a patch update. Fragmentation of a patch avoids single point of attack in a given cluster.

Figure 3:
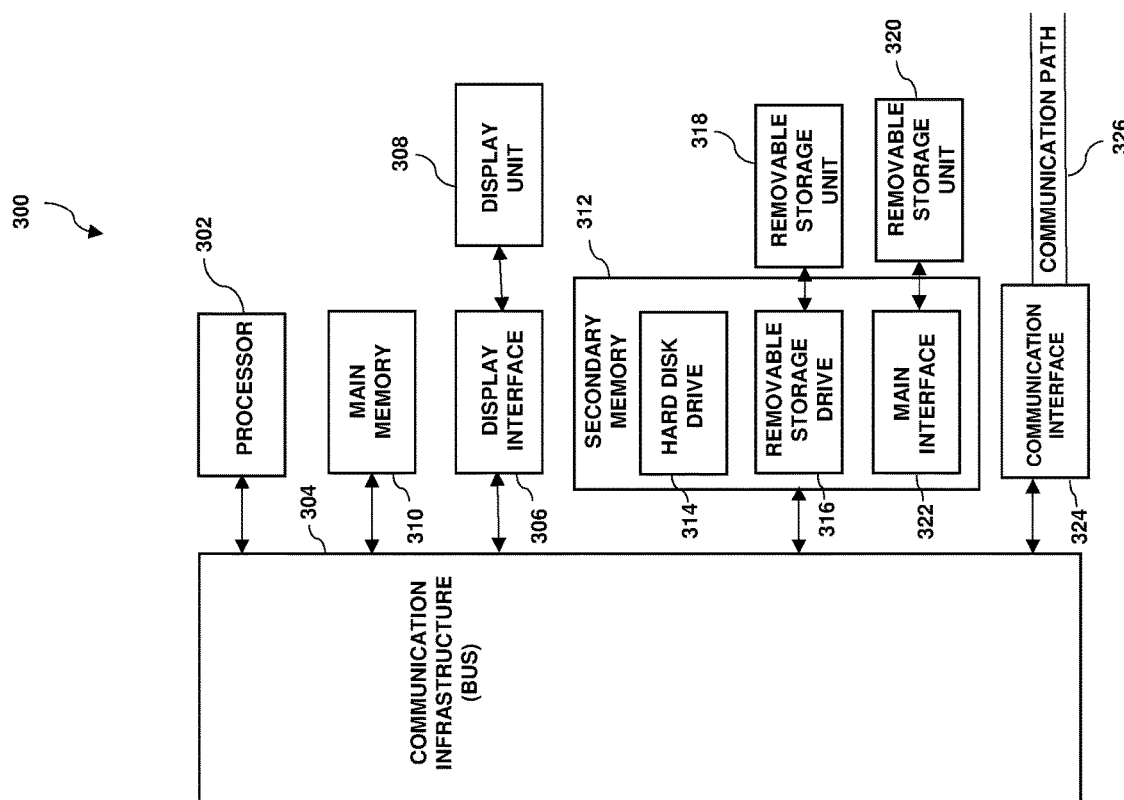
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
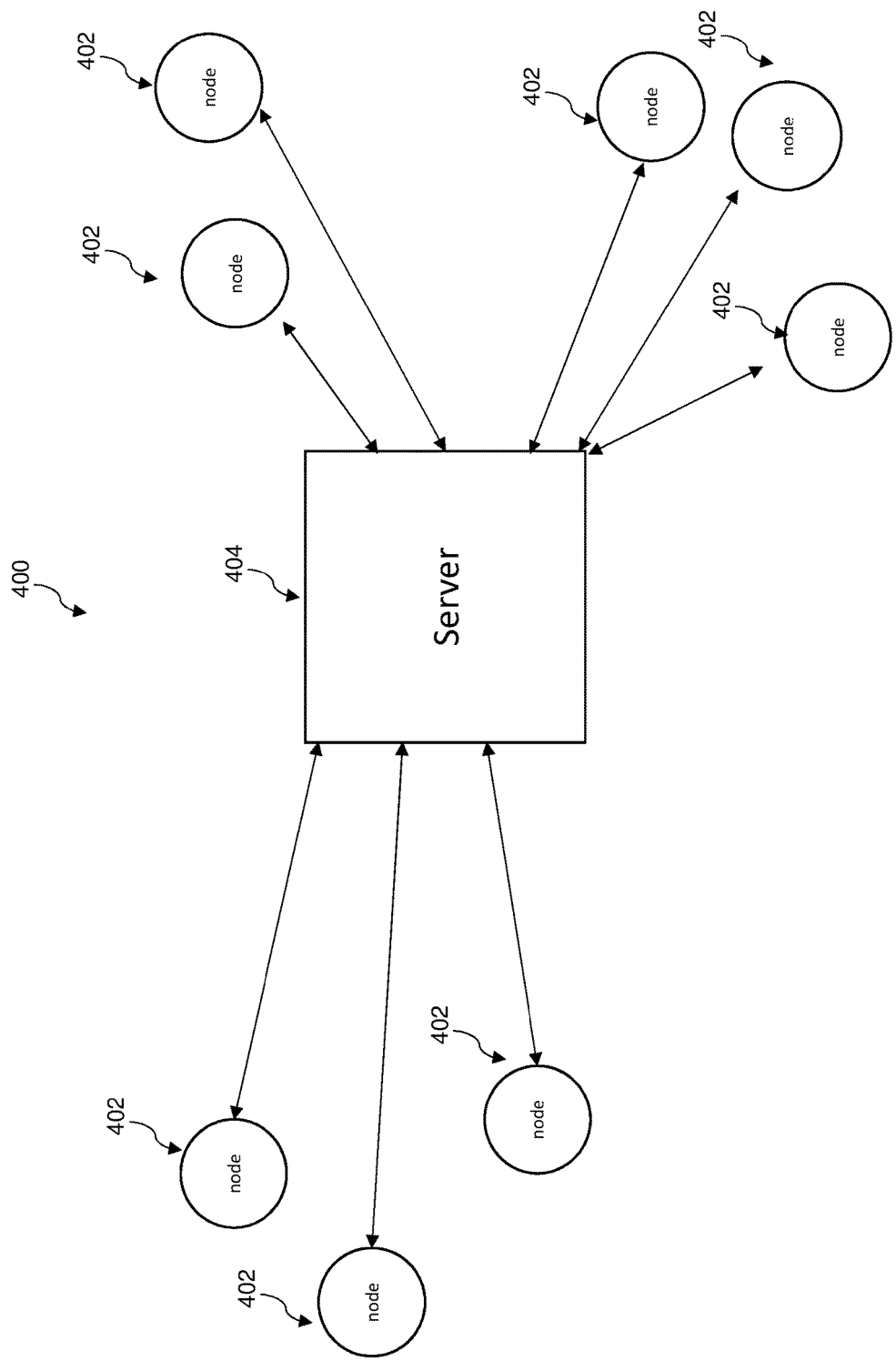
FIG. 4 depicts an example distributed environment in accordance with one or more embodiments of the present invention.

Referring now to FIG. 4, an example distributed environment 400 is presented for patching software in a server-client network. Distributed environment 400 includes a plurality of client nodes 402 (e.g., computing devices) and a server 404, which are interconnected via a network. FIG. 4 provides an illustration of only one example system shown in with a spanning tree topology and does not imply any limitation with regard to other systems in which different embodiments of the present invention may be implemented. Various suitable modifications to the depicted environment may be made, by those skilled in the art, without departing from the scope of the invention as recited by the claims.

In some embodiments of the present invention, server 404 is a standalone computing device, a management server, a web server, a mobile computing device, or other suitable electronic device and/or computing system capable of receiving, sending, and processing data. In some embodiments of the present invention, server 404 is a server utilizing multiple computers, such as in cloud computing environment 50. In some embodiments of the present invention, server 404 is a laptop computer, a tablet computer, a netbook computer, a personal computer (PC), a desktop computer, a personal digital assistant (PDA), a smart phone, or other suitable programmable electronic device capable of communicating with client nodes 402 and other computing devices (not shown) within distributed environment 400 via a network. In some embodiments of the present invention, server 404 is a computing system utilizing clustered computers and components (e.g., database server computers, application server computers, etc.) that act as a single pool of seamless resources that are accessible within distributed environment 400.

As noted above, client nodes 402 and server 404 are configured to communicate over a network In some embodiments of the present invention, the network is a telecommunications network, a local area network (LAN), a wide area network (WAN), such as the Internet, or a combination of the three, and can include wired, wireless, or fiber optic connections. In some embodiments of the present invention, the network includes one or more wired and/or wireless networks that are capable of receiving and transmitting data, voice, and/or video signals, including multimedia signals that include voice, data, and video information. In general, in some embodiments of the present invention the network can be any suitable combination of connections and protocols that can support communications between client nodes 402, server 404, and/or other computing devices (not shown) within a distributed environment 400. In some embodiments of the present invention, distributed environment 400 is implemented as part of a cloud computing environment such as cloud computing environment 50 (FIG. 1).

Each client node 402 represents a client device or component of the server-client network. For example, in some embodiments of the present invention, a client node 402 is a network switch, a user computer, an Internet-of-Things (IoT) enabled device such as home automation devices, smart city, sensors, and other devices that can execute applications, send information, and/or receive information from server 404 or other nodes. Each client node 402 includes software that can be patched. In some embodiments of the present invention, the software of each client node 402 is patched through the use of by a patch command and/or a patch file. In some embodiments of the present invention, client nodes 402 are each a laptop computer, a tablet computer, a netbook computer, a personal computer (PC), a desktop computer, a personal digital assistant (PDA), a smart phone, an internet-of-things (IoT) enabled device, and/or other suitable programmable electronic devices capable of communicating with various components and devices within distributed environment 400. In some embodiments of the present invention, each client node 402 comprises two or more separate devices. In some embodiments of the present invention, each client node 402 is a programmable electronic mobile device or a combination of programmable electronic mobile devices capable of executing machine readable program instructions and communicating with other computing devices (not shown) within distributed environment 400. In some embodiments of the present invention, each client node 402 includes internal and external hardware components, such as those depicted and described above with respect to FIG. 3.

As noted above, server 404 is generally configured to patch software in a server-client network, in which in some embodiments of the present invention, the server-client network includes at least one server and a plurality of client nodes (e.g., computing devices of the server-client network). As will be explained in further detail below in reference to FIGS. 5-10, server 404 breaks down the network into a number of clusters, in which each cluster includes a number of client nodes. A "leader" node is then dynamically chosen in each cluster by server 404. Server 404 is configured to transmit a software patch to the leader nodes. The leader of each cluster is configured to patch other nodes of the cluster. In some embodiments of the present invention, in the case where a cluster size of a cluster exceeds a parameterized threshold (e.g., a predetermined maximum number of nodes), the cluster is further divided by server 404 into second level clusters. This division recurs until all cluster sizes are under the parameterized threshold. In addition, in the case where no one node is completely trusted to patch the entire cluster (e.g., there is a likelihood above a predetermined threshold that that a node might be hacked), more than one leader can be promoted in the cluster and a patch is then fragmented amongst the multiple leader nodes of the associated cluster. The non-leader nodes would then communicate to all leaders in their associated cluster to obtain a complete patch.

Figure 5:
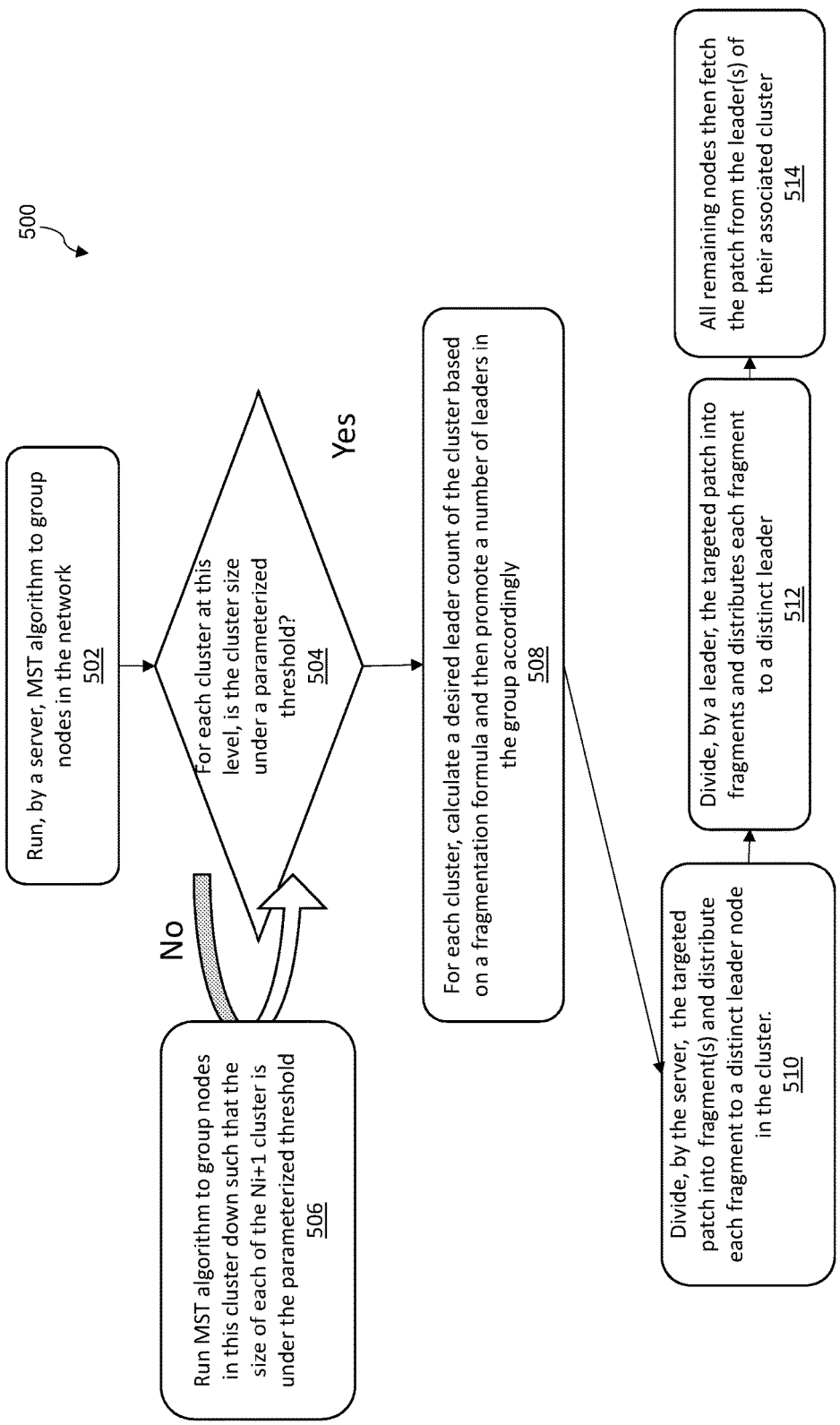
FIG. 5 depicts a flow diagram illustrating an example methodology for patching nodes in a server-client network in accordance with one or more embodiments of the present invention.
Figure 6:
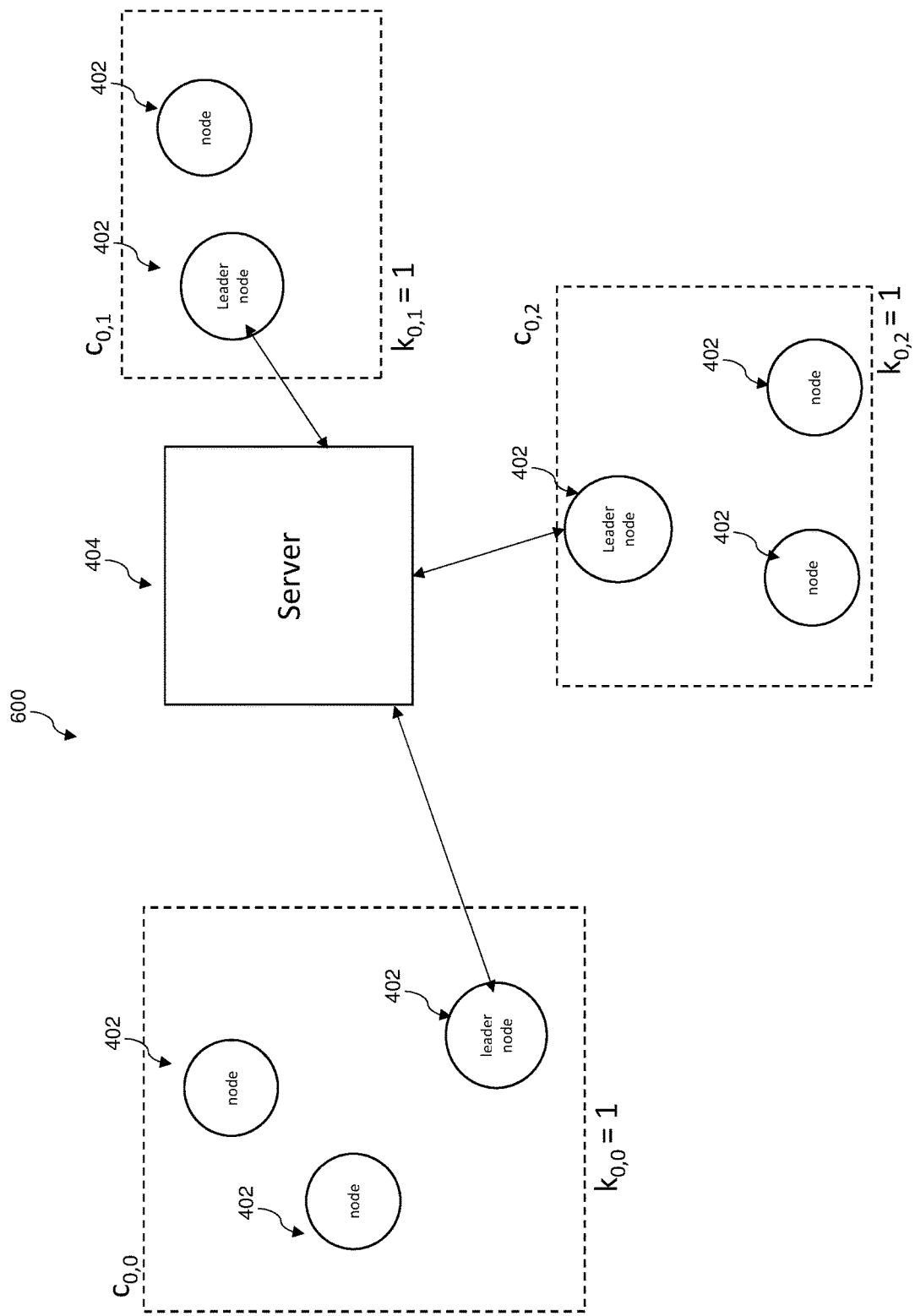
FIG. 6 depicts an example spanning tree topology in accordance with one or more embodiments of the present invention, in which a network is divided into initial level clusters.

FIG. 5 illustrates an example methodology 500 for patching nodes in a server-client network in accordance with one or more embodiments of the present invention. At 502, server 404 executes a minimum spanning tree (MST) to group client nodes of the network. In particular, server 404 executes an MST algorithm to group all nodes in the network down to $N_0$ clusters, in which N is a parameter corresponding to the number of clusters and subscript 0 representing the first/initial level clusters. FIG. 6 illustrates an example spanning tree topology 600 showing an example where server 404 divides the network into an initial level of clusters.

Referring back to FIG. 5, at 504, server 404 determines for each cluster at the initial level (e.g., first cluster level) whether the cluster size of the cluster is under a parameterized threshold. In some embodiments of the present invention, the parameterized threshold is a predetermined maximum number of nodes that is set by a user and/or determined by server 404. This check is performed to ensure that whichever node is promoted in step 508 would not be overburdened by having to patch too many nodes of the cluster.

Figure 7:
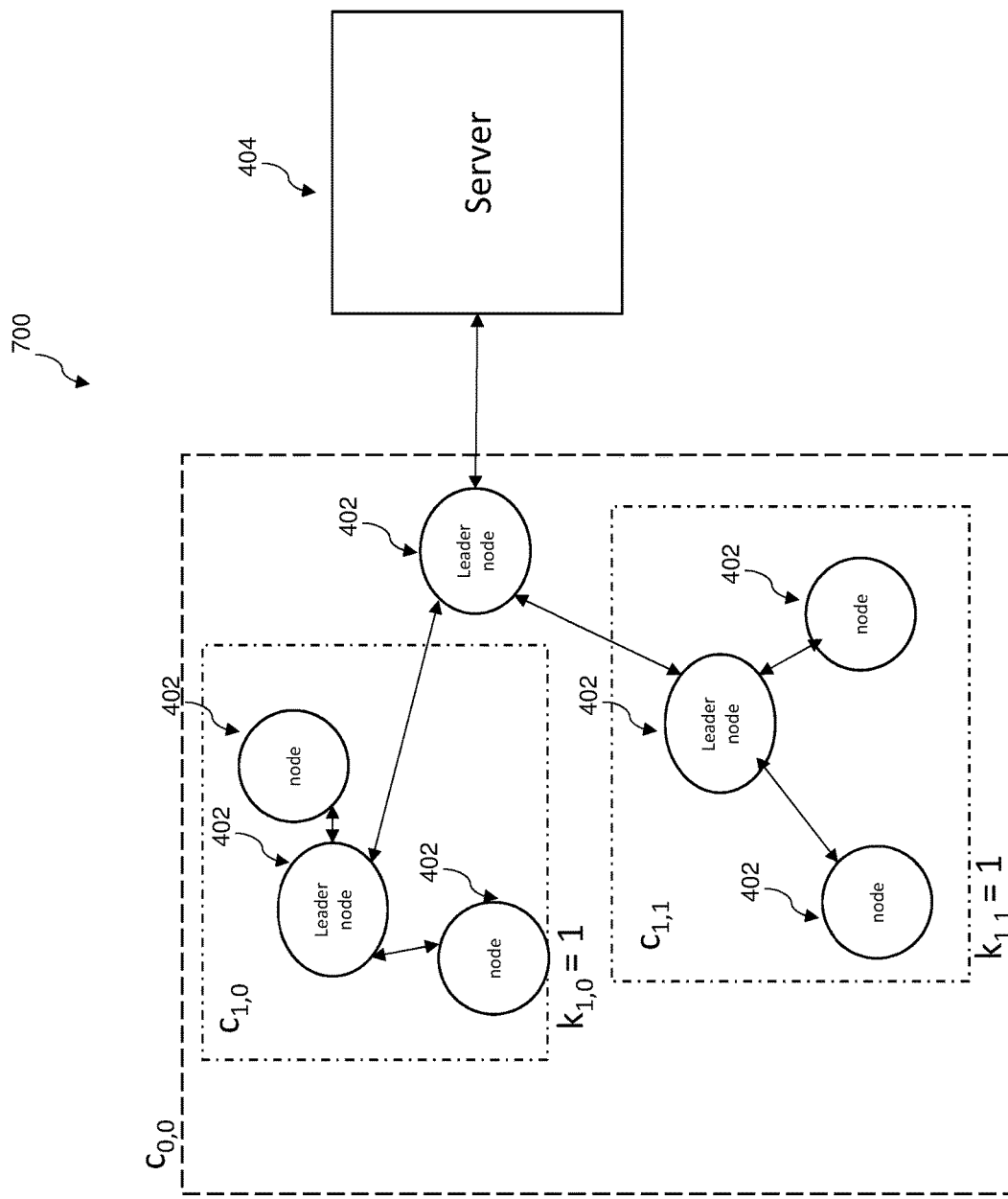
FIG. 7 depicts another example spanning tree topology in accordance with one or more embodiments of the present invention, in which a network is divided into initial level clusters and second level clusters, and in which a leader node is for an initial level cluster and a second level cluster.

At 506, if it is determined the clusters at the initial level are not under the parameterized threshold (e.g., there are too many nodes in a given cluster), then server 404 executes the MST algorithm to group all nodes in this cluster down to $N_{i+1}$ clusters such that the size of each of the $N_{i+1}$ cluster is under the parameterized threshold, in which i denotes the level the cluster belongs to. FIG. 7 illustrates an example spanning tree topology 700 where server 404 divides a certain cluster into a second level of clusters as the first level of clusters has a cluster size that is not under the parametrized threshold (e.g., maximum of three nodes). In some embodiments of the present invention, the number of times a cluster is subdivided depends on the value of a branching factor b, in which there can be at most $\log_b(N)$ levels in a hierarchy for N nodes. In some embodiments of the present invention the branching factor is two.

Referring back to FIG. 5, at 508, server 404, for each cluster $c_{i,n}$, calculates a leader count, $k_{i,n}$, of the cluster based on a fragmentation algorithm such as the one set forth below, and then dynamically promotes one or more leaders in the group in accordance with the fragmentation algorithm, in which $c_{i,n}$ represents an index to the n-th cluster at level i, in which subscript n ranges from 0 to $N_i-1$. The number of leaders in a given cluster is represented as $k_{i,n}$. In some embodiments of the present invention, server 404 is configured to determine which node of a given cluster to promote based on predetermined priority such as which node is situated closest to server 404 (e.g., shortest relative physical distance, shortest number of network hops, etc.), which node has the lowest relative latency, which node has the highest relative bandwidth, and/or other suitable priority criteria. For example, in some embodiments of the present invention, for an initial level cluster (e.g., first level cluster), server 404 is configured to assign a particular node of a cluster as being the leader node if the node is situated at the shortest distance from the server. Similarly, for a second level cluster for example, in some embodiments of the present invention, server 404 is configured to assign a particular node of a second level cluster as being the leader node if the node is situated at the shortest distance from the leader node of the first level cluster and/or server 404.

As noted above, at 508 a determination is made by server 404 regarding how many leader nodes are to be promoted in each cluster to be ensure that a sufficient number of leader nodes are present. In particular, in some embodiments of the preset invention, server 404 executes a fragmentation algorithm that can be used to calculate for each cluster $c_{i,n}$, whether there is a high likelihood that $k_{i,n}$ node(s) are sufficient to patch the entire cluster. For example, in some embodiments of the present invention, server 404 is configured to determine how unlikely is it that $k_{i,n}$ node(s) get hacked simultaneously.

That following is an illustrative example of a fragmentation algorithm in accordance with one or more embodiments of the present invention for determining how unlikely is it that $k_{i,n}$ node(s) will be hacked:

(1) gather heuristic data such as the probability P of a node getting hacked from the history of an existing network;
(2) for a given network (or a cluster within the network if finer granularity is desired), set a parametrized confidence level C to indicate the certainty that there are sufficient leaders in the cluster such that at least one leader is guaranteed not to be hacked, which allows server 404 to detect when one or more leaders are hacked;
(3) compute the probability of x nodes getting hacked:

$$P(x)=(N \text{ Choose } x)*(1-P)^{N-x}*P^x,$$

where N is the total number of nodes in the cluster; and
(4) calculate the probability of at most x nodes getting hacked in the cluster and find the smallest X that satisfies the following equation, in which X denotes the number of leaders to be used in the cluster:

$$\sum_{i=0}^{x} P(i) \geq C$$

The following is an illustrative example implementation of the algorithm above, in which the cluster size N is 100 and the probability of a node getting hacked, P is 2% or 0.02:

a. set the confidence level C to be 0.95, which represents a target confidence of 95% that at least one leader is not hacked;
b. compute the probability of P(x) for x ranges from 0-100:

$$P(0) = 1*0.98^{100}*0.02^0 = 0.1326$$

$$P(1) = 100*0.98^{99}*0.02 = 0.2706$$

-continued $$P(2) = 4950 * 0.98^{98} * 0.02^2 = 0.2734$$

...

c. promoting five nodes to be leaders as he smallest X that satisfies the following equation is five:

$$\sum_{i=0}^{5} P(i) = 0.1326 + 0.2706 +$$

$$0.2734 + 0.1822 + 0.09 + 0.035 = 0.9845 \geq 0.95$$

In some embodiments of the present invention, server 404 is configured to determine how many leader nodes would be sufficient for each cluster based on determining whether the cluster can be patched within a predetermined amount of time. For example, given that a node can at a given time only transmit or receive, and that a time to patch a single node is T seconds (ignoring the start/stop transaction overhead), if there is only one leader and N receiving nodes in the cluster, the total time TT to patch the cluster is TT=N*T. If there are two leader nodes and N receiving nodes in the cluster, the total time TT to patch the cluster would be TT=(N/2)*(T/2)+(N/2)*(T/2)=N*T/2. If one leader is assigned to patch a first subset of nodes in a cluster and a second leader is assigned to patch a second subset of nodes in the cluster in parallel, then the time it takes to half-patch a node is T/2 and there are only N/2 nodes in the subset. Such a half-patching process would take (N/2)*(T/2) seconds. After the half-patching process is complete, the leaders would route to the next subset of nodes and the process is repeated which takes another (N/2)*(T/2) seconds, which results in a total time TT would be TT=N*T/2 for a situation with two leader nodes. Accordingly, in general, if a time to patch one node is T seconds, and if there are L leaders and N receiving nodes in a given cluster, then the total time TT can be computed as TT=N*T/L. In some embodiments of the present invention, server 404 calculates the total time that is estimated for the presently promoted leaders to perform a patch and then determines whether the total time exceeds a predetermined maximum patch time. If the total time exceeds the predetermined maximum patch time, then an additional leader node is promoted for the given cluster.

Figure 8:
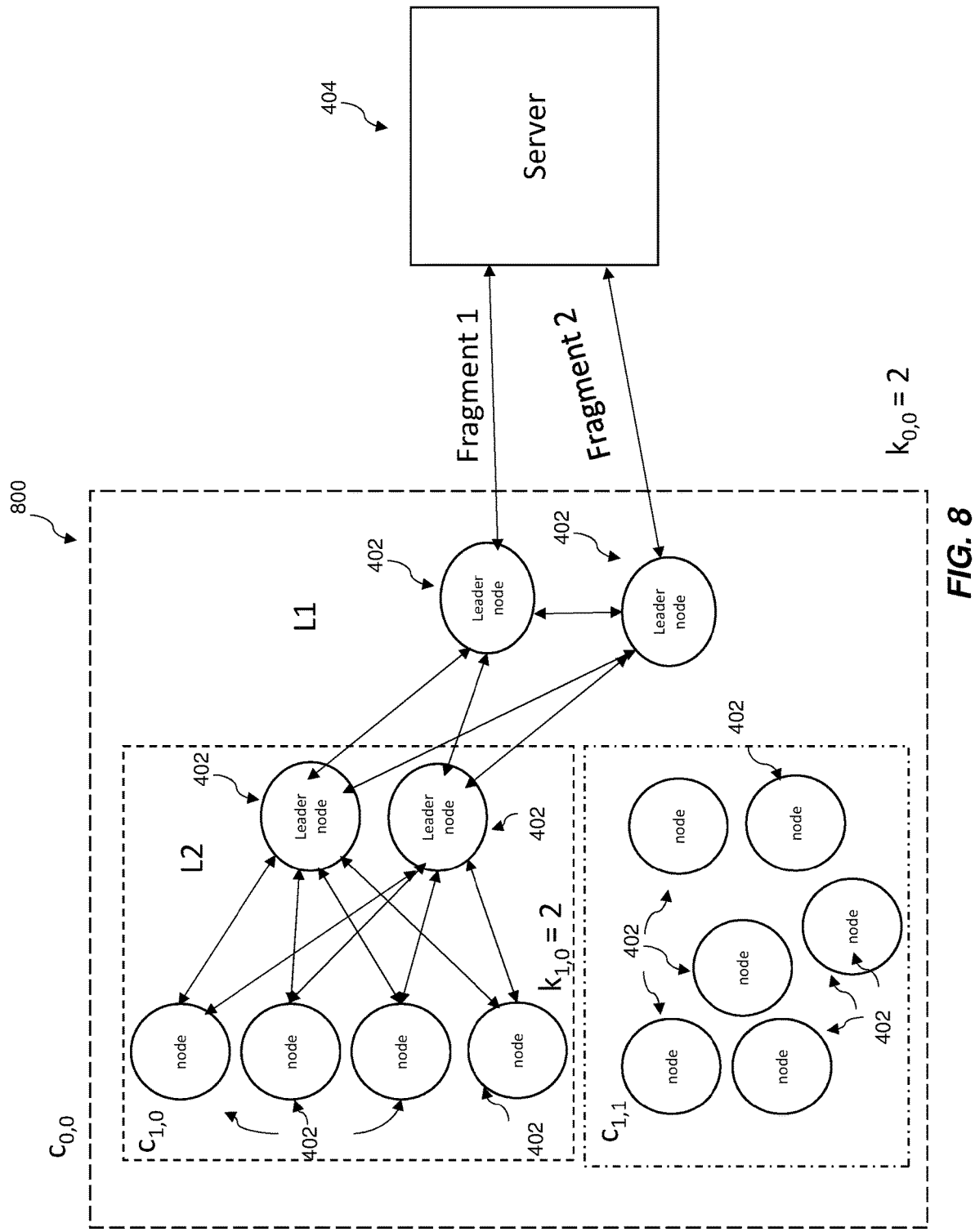
FIG. 8 depicts another example spanning tree topology in accordance with one or more embodiments of the present invention, in which a network is divided into initial level clusters and second level clusters, and in which two leaders nodes are assigned for an initial level cluster and a second level cluster.

As can be seen in FIG. 7, spanning tree topology 700 shows an example instance where two levels of clusters are created in which there is only one leader per cluster. In particular, one cluster $c_{0,0}$ is created in a first cluster level, and two clusters $c_{1,0}$ and $c_{1,1}$ are created in the second cluster level, in which cluster $c_{0,0}$ in the first level has one leader node ($k_{0,0}$=1), and in which cluster $c_{1,0}$ and $c_1$, in the second level each have one leader node ($k_{1,0}$=1, and $k_{1,1}$=1). FIG. 8, in contrast, illustrates another example spanning tree topology 800 in accordance with one or more embodiments of the present invention, in which server 404 has promoted more than one leader in certain clusters of a first cluster level and second cluster level. In particular, one cluster $c_{0,0}$ is created in a first cluster level, and two clusters $c_{1,0}$ and $c_{1,1}$ are created in the second cluster level, in which cluster $c_{0,0}$ in the first cluster level has two leader nodes ($k_{0,0}$=2) and cluster $c_{1,1}$ in the second cluster level has two leader nodes ($k_{1,0}$=2, and $k_{1,1}$=1).

At 510, software patching begins. For each cluster $c_{0,n}$ in which n ranges from 0 to $N_0$–1, server 404 is configured to divide the software patch into $k_{0,n}$ fragment(s) and to distribute each fragment to a distinct leader node in the cluster $c_{i,n}$. If $k_{0,n}$ is equal to one (i.e., if a given cluster has only one leader), then the entire software patch is transmitted to the leader (i.e., no fragments). If there are two or more leaders in a cluster, then two or more fragments are created (i.e., one fragment for each leader of a given cluster). As can be seen in spanning tree topology 800, in that example server 404 fragments the software patch into two fragments, in which a first fragment is transmitted to a first leader node of a given cluster and a second fragment is transmitted to a second leader node.

Referring back to FIG. 5, at 512, each leader node performs a process similar to step 510 above. In particular, for i ranges from 1 to I–1 and n ranges from 0 to $N_i$–1, in which I denotes the highest cluster level in the network, the leader nodes(s) of $c_{i-1,n}$ are configured to divide the software patch into $k_{i,n}$ fragment(s) and then distribute each fragment to a distinct leader in $c_{i,n}$. At 514, all remaining nodes then fetch the patch from the leader(s) of their associated cluster.

Figure 9:
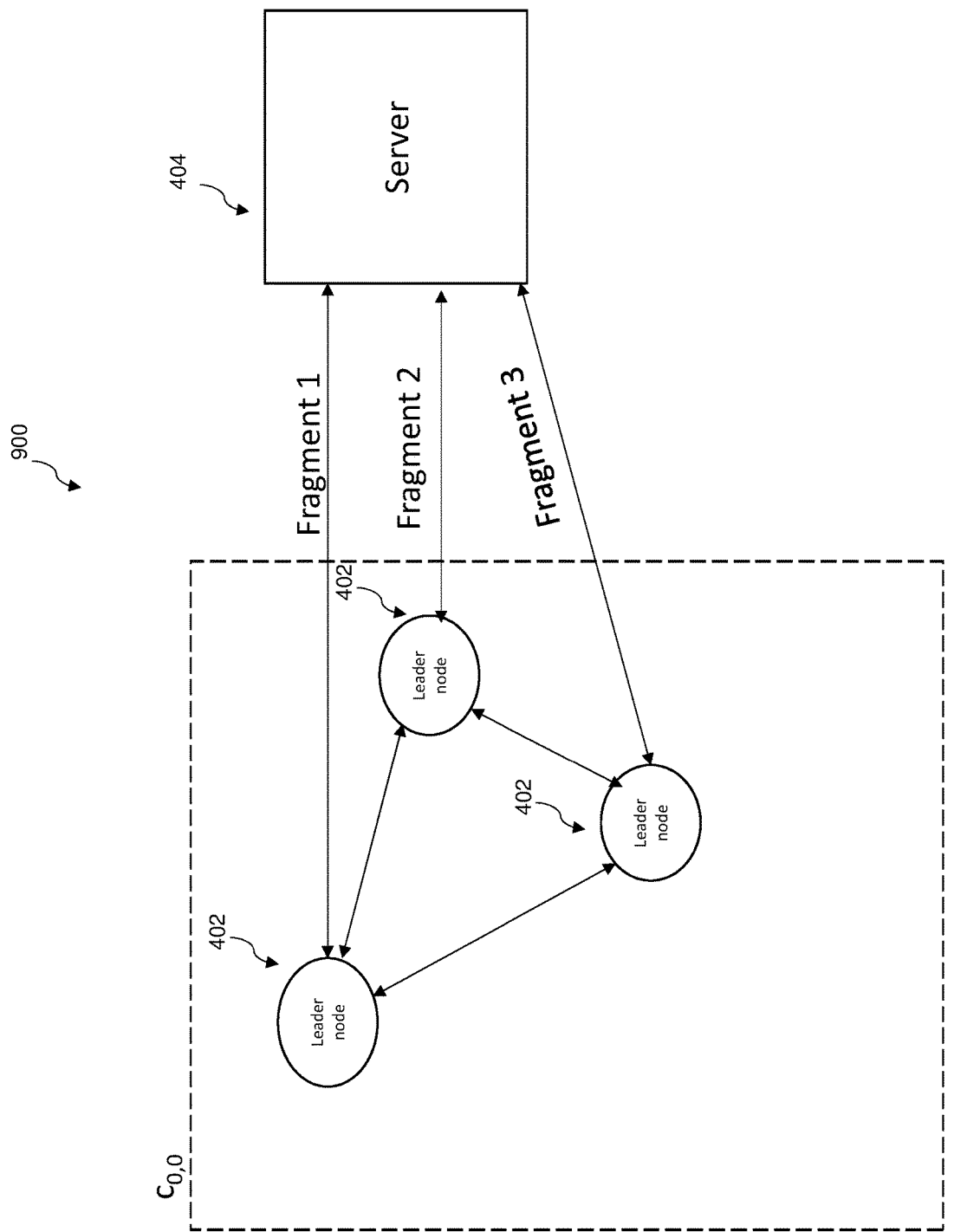
FIG. 9 depicts another example spanning tree topology in accordance with one or more embodiments of the present invention, in which a network is divided into initial level clusters, and in which three leader nodes are assigned for an initial level cluster.

FIG. 9 illustrates another example spanning tree topology 900 in accordance with one or more embodiments of the present invention, in which server 404 assigns all the nodes of a given cluster as being a leader of the cluster (e.g., all nodes are leaders). In particular, one cluster $c_{0,0}$ is created in a first cluster level, in which cluster $c_{0,0}$ has three leader nodes ($k_{0,0}$=3). Server 404 fragments the patch file into three fragments and transmits each fragment to a respective node. Each leader node may then transmit its received fragment to other nodes in the cluster. By fragmenting the patch file in this way, if a certain node is attached or fails, then the cluster as a whole would not fail because of a single unavailable node. In some embodiments of the present invention, the nodes utilize a hashing function to ensure the security of the fragments by comparing hashes to previous and next fragments.

Figure 10:
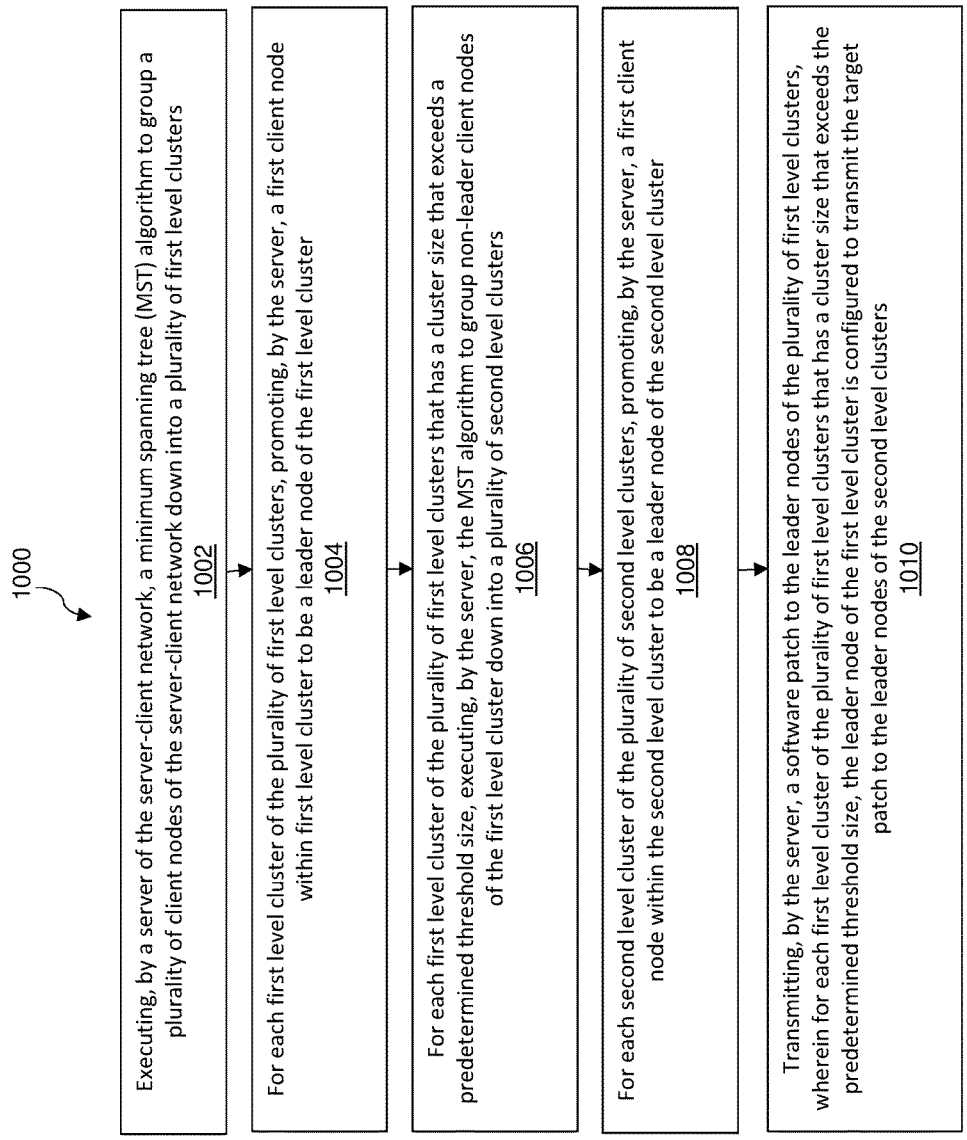
FIG. 10 depicts a flow diagram illustrating another example methodology in accordance with one or more embodiments of the present invention.

Additional details of the operation of server 404 will now be described with reference to FIG. 10, in which FIG. 10 depicts a flow diagram illustrating a methodology 1000 according to one or more embodiments of the present invention. At 1002, a MST algorithm is executed by a server of a server-client network to group a plurality of client nodes of the server-client network down into a plurality of first level clusters. At 1004, for each first level cluster of the plurality of first level clusters, the server promotes a first client node within first level cluster to be a leader node of the first level cluster. In some embodiments of the preset invention, the promoting of the first client node within the first level cluster to be a leader node of the first level cluster includes identifying a location of each client node of the first level cluster and a location of the server, calculating a relative distance between the location of the server and the location of each client node of the first level cluster, and then the client node that has the shortest relative distance to the server.

At 1006, for each first level cluster of the plurality of first level clusters that has a cluster size that exceeds a predetermined threshold size, the server executes the MST algorithm to group non-leader client nodes of the first level cluster down into a plurality of second level clusters. At 1008, for each second level cluster of the plurality of second level clusters, the server promotes a first client node within the second level cluster to be a leader node of the second level cluster. At 1010, a software patch is transmitted by the server to the leader nodes of the plurality of first level clusters. For each first level cluster of the plurality of first level clusters that has a cluster size that exceeds the predetermined threshold size, the leader node of the first level cluster is configured to transmit the software patch to the leader nodes of the second level clusters.

In some embodiments of the present invention, each second level cluster of the plurality of second level clusters includes non-leader nodes that are configured to fetch the software patch from the leader node of the second level cluster.

In some embodiments of the present invention, methodology 1000 includes, for each second level cluster of the plurality of second level clusters that has a cluster size that exceeds the predetermined threshold size, executing, by the server, the MST algorithm to group non-leader client nodes of the second level cluster down into a plurality of third level clusters, and then for each third level cluster of the plurality of third level clusters, promoting, by the server, a first client node within the third level cluster to be a leader node of the third level cluster. In some embodiments of the present invention, each third level cluster of the plurality of third level clusters includes non-leader nodes configured to fetch the software patch from the leader node of the third level cluster.

In some embodiments of the present invention, methodology 1000 includes, for at least one first level cluster of the plurality of first level clusters, further promoting, by the server, a second client node within at least one first level cluster to be a leader node of the at least one first level cluster. In some embodiments of the preset invention, the software patch is transmitted from the server to the leader nodes of the plurality of first level clusters by the server fragmenting the software patch into a first portion and a second portion, transmitting the first portion of the software patch to the first client node of the at least one first level cluster, and transmitting the second portion of the software patch to the second client node of the at least one first level cluster. In some embodiments of the present invention, the first client node of the at least one first level cluster is configured to transmit the first portion of the software patch to the leader node of at least one second level cluster of the plurality of second level clusters, and the second client node of the at least one first level cluster is configured to transmit the second portion of the software patch to the leader node of the at least one second level cluster.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for patching software in a server-client network, the computer-implemented method comprising:
   executing, by a server of the server-client network, a minimum spanning tree (MST) algorithm to group a plurality of client nodes of the server-client network down into a plurality of first level clusters;
   for each first level cluster of the plurality of first level clusters, promoting, by the server, a first client node within first level cluster to be a leader node of the first level cluster;
   for each first level cluster of the plurality of first level clusters that has a cluster size that exceeds a predetermined threshold size, executing, by the server, the MST algorithm to group non-leader client nodes of the first level cluster down into a plurality of second level clusters, wherein the executing of the MST algorithm to group non-leader client nodes is repeated until all cluster sizes are under a predetermined parameterized threshold, the predetermined parameterized threshold being a likelihood that a node might be hacked;
   for each second level cluster of the plurality of second level clusters, promoting, by the server, a first client node within the second level cluster to be a leader node of the second level cluster; and
   transmitting, by the server, a software patch to the leader nodes of the plurality of first level clusters, wherein for each first level cluster of the plurality of first level clusters that has a cluster size that exceeds the predetermined threshold size, the leader node of the first level cluster is configured to transmit the software patch to the leader nodes of the second level clusters.

2. The computer-implemented method of claim 1, wherein each second level cluster of the plurality of second level clusters includes non-leader nodes configured to fetch the software patch from the leader node of the second level cluster.

3. The computer-implemented method of claim 1 further comprising:
   for at least one first level cluster of the plurality of first level clusters, further promoting, by the server, a second client node within at least one first level cluster to be a leader node of the at least one first level cluster;
   wherein transmitting the software patch from the server to the leader nodes of the plurality of first level clusters includes:
      fragmenting the software patch into a first portion and a second portion;
      transmitting the first portion of the software patch to the first client node of the at least one first level cluster; and
      transmitting the second portion of the software patch to the second client node of the at least one first level cluster.

4. The computer-implemented method of claim 3, wherein the first client node of the at least one first level cluster is configured to transmit the first portion of the software patch to the leader node of at least one second level cluster of the plurality of second level clusters, and wherein the second client node of the at least one first level cluster is configured to transmit the second portion of the software patch to the leader node of the at least one second level cluster.

5. The computer-implemented method of claim 1, wherein promoting a first client node within first level cluster to be a leader node of the first level cluster comprises:
   identifying a location of each client node of the first level cluster and a location of the server;
   calculating a relative distance between the location of the server and the location of each client node of the first level cluster; and
   promoting a client node of the first level cluster that has the shortest relative distance to the server to be the first client node.

6. The computer-implemented method of claim 1 further comprising:
   for each second level cluster of the plurality of second level clusters that has a cluster size that exceeds the predetermined threshold size, executing, by the server, the MST algorithm to group non-leader client nodes of the second level cluster down into a plurality of third level clusters; and for each third level cluster of the plurality of third level clusters, promoting, by the server, a first client node within the third level cluster to be a leader node of the third level cluster.

7. The computer-implemented method of claim 6, wherein each third level cluster of the plurality of third level clusters includes non-leader nodes configured to fetch the software patch from the leader node of the third level cluster.

8. A computer program product for patching software in a server-client network, the computer program product comprising a computer readable storage medium having program instructions embodied therewith, the program instructions executable by a server of the server-client network, the server comprising one or more processors to cause the server to perform a method, the method comprising:

executing, by the server, a minimum spanning tree (MST) algorithm to group a plurality of client nodes of the server-client network down into a plurality of first level clusters;

for each first level cluster of the plurality of first level clusters, promoting, by the server, a first client node within first level cluster to be a leader node of the first level cluster;

for each first level cluster of the plurality of first level clusters that has a cluster size that exceeds a predetermined threshold size, executing, by the server, the MST algorithm to group non-leader client nodes of the first level cluster down into a plurality of second level clusters, wherein the executing of the MST algorithm to group non-leader client nodes is repeated until all cluster sizes are under a predetermined parameterized threshold, the predetermined parameterized threshold being a likelihood that a node might be hacked;

for each second level cluster of the plurality of second level clusters, promoting, by the server, a first client node within the second level cluster to be a leader node of the second level cluster; and transmitting, by the server, a software patch to the leader nodes of the plurality of first level clusters, wherein for each first level cluster of the plurality of first level clusters that has a cluster size that exceeds the predetermined threshold size, the leader node of the first level cluster is configured to transmit the software patch to the leader nodes of the second level clusters.

9. The computer program product of claim 8, wherein each second level cluster of the plurality of second level clusters includes non-leader nodes configured to fetch the software patch from the leader node of the second level cluster.

10. The computer program product of claim 8, wherein the method further includes:

for at least one first level cluster of the plurality of first level clusters, further promoting, by the server, a second client node within at least one first level cluster to be a leader node of the at least one first level cluster;

wherein transmitting the software patch from the server to the leader nodes of the plurality of first level clusters includes:

fragmenting the software patch into a first portion and a second portion;

transmitting the first portion of the software patch to the first client node of the at least one first level cluster; and transmitting the second portion of the software patch to the second client node of the at least one first level cluster.

11. The computer program product of claim 10, wherein the first client node of the at least one first level cluster is configured to transmit the first portion of the software patch to the leader node of at least one second level cluster of the plurality of second level clusters, and wherein the second client node of the at least one first level cluster is configured to transmit the second portion of the software patch to the leader node of the at least one second level cluster.

12. The computer program product of claim 8, wherein promoting a first client node within first level cluster to be a leader node of the first level cluster comprises:

identifying a location of each client node of the first level cluster and a location of the server;

calculating a relative distance between the location of the server and the location of each client node of the first level cluster; and promoting a client node of the first level cluster that has the shortest relative distance to the server to be the first client node.

13. The computer program product of claim 8, wherein the method further includes:

for each second level cluster of the plurality of second level clusters that has a cluster size that exceeds the predetermined threshold size, executing, by the server, the MST algorithm to group non-leader client nodes of the second level cluster down into a plurality of third level clusters; and for each third level cluster of the plurality of third level clusters, promoting, by the server, a first client node within the third level cluster to be a leader node of the third level cluster.

14. The computer program product of claim 13 wherein each third level cluster of the plurality of third level clusters includes non-leader nodes configured to fetch the software patch from the leader node of the third level cluster.

15. A system for patching software in a server-client network, the system comprising a server and a plurality of client nodes, the server comprising one or more processors configured to perform a method comprising:

executing, by the server, a minimum spanning tree (MST) algorithm to group the plurality of client nodes down into a plurality of first level clusters;

for each first level cluster of the plurality of first level clusters, promoting, by the server, a first client node within first level cluster to be a leader node of the first level cluster;

for each first level cluster of the plurality of first level clusters that has a cluster size that exceeds a predetermined threshold size, executing, by the server, the MST algorithm to group non-leader client nodes of the first level cluster down into a plurality of second level clusters, wherein the executing of the MST algorithm to group non-leader client nodes is repeated until all cluster sizes are under a predetermined parameterized threshold, the predetermined parameterized threshold being a likelihood that a node might be hacked;

for each second level cluster of the plurality of second level clusters, promoting, by the server, a first client node within the second level cluster to be a leader node of the second level cluster; and transmitting, by the server, a software patch to the leader nodes of the plurality of first level clusters, wherein for each first level cluster of the plurality of first level clusters that has a cluster size that exceeds the predetermined threshold size, the leader node of the first level cluster is configured to transmit the software patch to the leader nodes of the second level clusters.

16. The system of claim 15, wherein each second level cluster of the plurality of second level clusters includes non-leader nodes configured to fetch the software patch from the leader node of the second level cluster.

17. The system of claim 15, wherein the method further includes:
for at least one first level cluster of the plurality of first level clusters, further promoting, by the server, a second client node within at least one first level cluster to be a leader node of the at least one first level cluster;
wherein transmitting the software patch from the server to the leader nodes of the plurality of first level clusters includes:
fragmenting the software patch into a first portion and a second portion;
transmitting the first portion of the software patch to the first client node of the at least one first level cluster; and
transmitting the second portion of the software patch to the second client node of the at least one first level cluster.

18. The system of claim 17, wherein the first client node of the at least one first level cluster is configured to transmit the first portion of the software patch to the leader node of at least one second level cluster of the plurality of second level clusters, and wherein the second client node of the at least one first level cluster is configured to transmit the second portion of the software patch to the leader node of the at least one second level cluster.

19. The system of claim 15, wherein promoting a first client node within first level cluster to be a leader node of the first level cluster comprises:
identifying a location of each client node of the first level cluster and a location of the server;
calculating a relative distance between the location of the server and the location of each client node of the first level cluster; and
promoting a client node of the first level cluster that has the shortest relative distance to the server to be the first client node.

20. The system of claim 15, wherein the method further includes:
for each second level cluster of the plurality of second level clusters that has a cluster size that exceeds the predetermined threshold size, executing, by the server, the MST algorithm to group non-leader client nodes of the second level cluster down into a plurality of third level clusters; and
for each third level cluster of the plurality of third level clusters, promoting, by the server, a first client node within the third level cluster to be a leader node of the third level cluster.

\* \* \* \* \*